(12) United States Patent
Rosario

(10) Patent No.: US 7,721,486 B2
(45) Date of Patent: May 25, 2010

(54) DEVICE FOR CAPTURING SMALL PESTS

(76) Inventor: Rhanfy Rosario, 609 Liberty Ave., North Bergen, NJ (US) 07047

( * ) Notice: Subject to any disclaimer, the term of this patent is extended or adjusted under 35 U.S.C. 154(b) by 189 days.

(21) Appl. No.: 11/959,799

(22) Filed: Dec. 19, 2007

(65) Prior Publication Data
US 2009/0158636 A1    Jun. 25, 2009

(51) Int. Cl.
*A01M 3/04* (2006.01)
(52) U.S. Cl. .......................... 43/136; 43/137
(58) Field of Classification Search .......... 43/136, 43/137, 114
See application file for complete search history.

(56) References Cited

U.S. PATENT DOCUMENTS

| | | | |
|---|---|---|---|
| 834,039 A | 10/1906 | Bailey | |
| 884,213 A | 4/1908 | Schmidt | |
| 1,005,443 A | 10/1911 | Luckett | |
| 1,083,179 A | 12/1913 | Armstrong | |
| 1,604,460 A | 10/1926 | Marlow | |
| 1,718,805 A | 6/1929 | Wilkie et al. | |
| 1,802,774 A | 4/1931 | Nixon | |
| 2,015,092 A | 9/1935 | Turnquist | |
| 2,437,447 A | 3/1948 | Tarbell | |
| 2,618,882 A | 11/1952 | Martin | |
| 3,449,856 A | 6/1969 | Weaver | |
| 4,120,114 A | 10/1978 | Little et al. | |
| 4,653,222 A * | 3/1987 | Viscosi | 43/137 |
| 4,759,150 A | 7/1988 | Pierce | |
| 4,787,171 A * | 11/1988 | Dagenais | 43/137 |
| 4,905,408 A | 3/1990 | Wu | |
| 4,907,367 A | 3/1990 | Herman | |
| 5,269,092 A * | 12/1993 | Cobble | 43/137 |
| 5,630,290 A | 5/1997 | Wade et al. | |
| 6,055,767 A | 5/2000 | Carter | |
| 6,067,746 A | 5/2000 | Kistner et al. | |
| 6,957,510 B1 | 10/2005 | Kominkiewicz | |
| 7,165,355 B2 | 1/2007 | George et al. | |
| 2003/0024151 A1* | 2/2003 | Kremer | 43/136 |
| 2003/0159334 A1* | 8/2003 | Anderson et al. | 43/136 |
| 2004/0163304 A1* | 8/2004 | Nelson | 43/136 |
| 2005/0132638 A1* | 6/2005 | Anderson et al. | 43/136 |
| 2008/0040967 A1* | 2/2008 | Young | 43/136 |

* cited by examiner

*Primary Examiner*—Christopher P Ellis
(74) *Attorney, Agent, or Firm*—Thomas L. Adams

(57) ABSTRACT

A device can capture small pests with a sheet overlaying a perforated panel. The sheet may be one layer or several separable and disposable layers with pest detaining adhesive applied to at least a portion of an outer side. The sheet has a marginal recess with a deflected pull tab that is no longer or wider than the recess. The perforated panel has a handle and a peripheral wall with a first and a second section rising in opposite directions from the panel. The panel has at least one overhang projecting inwardly from the peripheral wall for holding the sheet in place. The outer side of said sheet is adhesive free in a region located under the overhang. A cover can fit on the panel and at least partially cover it. The cover has at least one internal detent for engaging the panel and holding it in place.

14 Claims, 2 Drawing Sheets

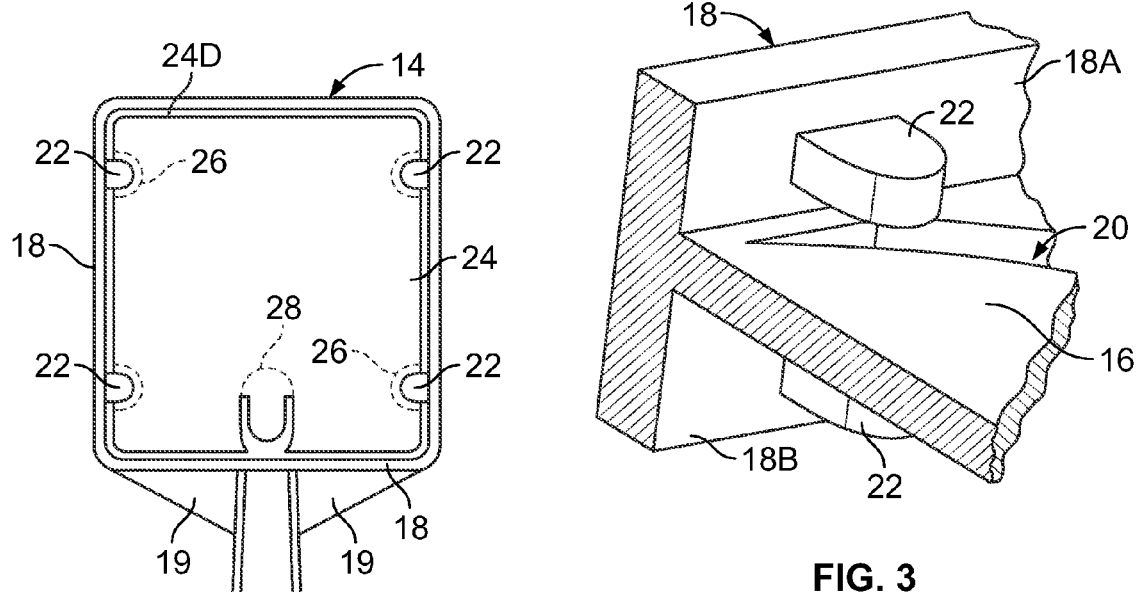
FIG. 3
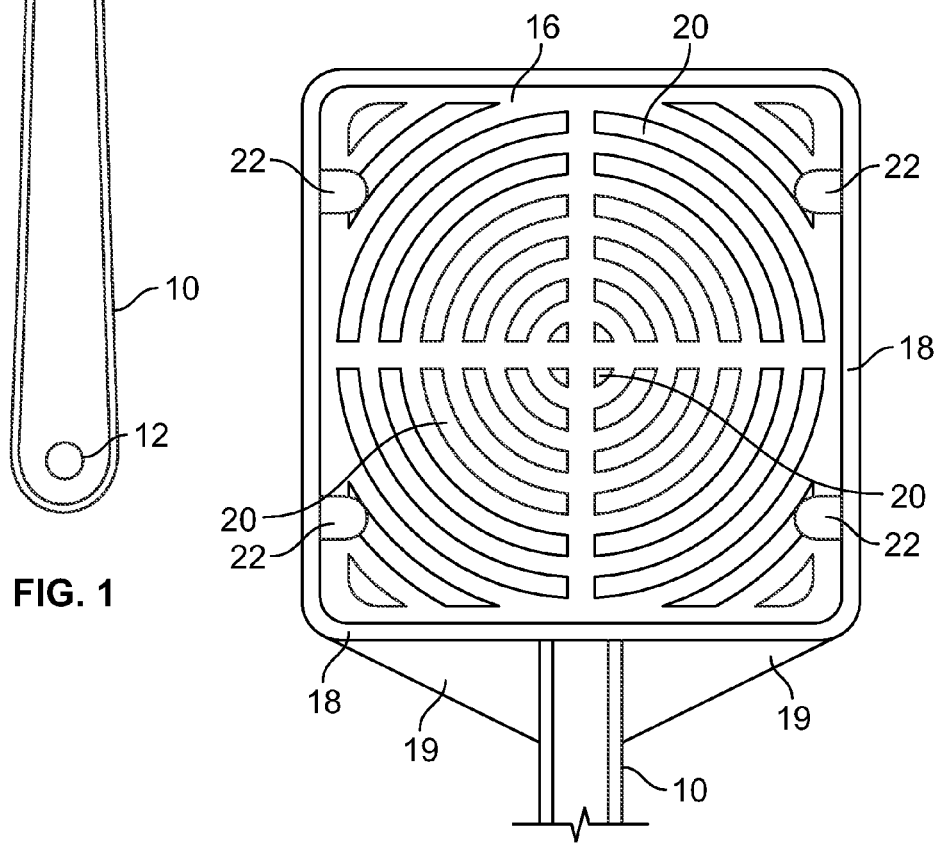
FIG. 1
FIG. 2

DEVICE FOR CAPTURING SMALL PESTS

BACKGROUND OF THE INVENTION

1. Field of the Invention

The present invention relates to fly swatters and devices for capturing small pests, and in particular, devices using an adhesive to capture small pests

2. Description of Related Art

Flying insects, spiders and other small pests are not only annoying but can carry disease, bite, and present other health hazards. Using an insect spray to exterminate these pests may be undesirable inside a home because of concerns with environmental pollution or contamination of foodstuffs.

House flies can be captured by an adhesive strip that is suspended from the ceiling. This stationary strip can be scented or otherwise impregnated to attract flies. Flies landing on the strip are caught on the adhesive and eventually die. While effective, the sight of several dead flies stuck to an adhesive strip is somewhat repulsive. Moreover, one cannot know in advance where the house fly will appear and suspending multiple strips in every room adds to the unpleasantness and cost of these adhesive strips.

The well-known fly swatter may have a handle supporting a plastic perforated panel. With this device a user attempts to quickly swat the fly after it lands on a flat surface. Unfortunately, the fly can land behind Venetian blinds, inside a lamp shade or in a crevice of an uneven surface, safe from the swatter. Also, the user may be unable to use the swatter without causing damage if the fly should land on something fragile such as a light fixture.

See also U.S. Pat. Nos. 834,039; 884,213; 1,005,443; 1,083,179; 1,604,460; 1,718,805; 1,802,774; 2,437,447; 2,618,882; 2,015,092; 3,449,856; 4,120,114; 4,653,222; 4,759,150; 4,787,171; 4,905,408; 4,907,367; 5,269,092; 5,630,290; 6,055,767; 6,067,746; 6,957,510; and 7,165,355.

SUMMARY OF THE INVENTION

In accordance with the illustrative embodiments demonstrating features and advantages of the present invention, there is provided a device for capturing small pests. The device has a sheet with an outer side and a panel with a handle. The panel has at least one overhang for holding the sheet in place. The sheet is mounted on the panel. The outer side of the sheet is partially coated with a pest detaining adhesive but is adhesive free in a region located under the overhang.

According to another aspect of the invention, there is provided a device for capturing small pests. The device includes a sheet having a margin with a marginal recess and an outer side coated at least partially with a pest detaining adhesive. The sheet has a pull tab in the recess that is no longer or wider than the recess. The device also has a panel with a handle and adapted to hold the sheet.

According to yet another aspect of the invention, there is provided a device for capturing small pests. The device includes a sheet having a separable stack of disposable layers each with pest detaining adhesive applied to at least a portion of an outer side. The layers each have a margin with a marginal recess. Each of the layers has a deflected pull tab in the recess that is no longer or wider than the recess. The device also has a perforated panel with a handle. The panel has a peripheral wall with a first and a second section rising in opposite directions from the panel. The panel has at least one overhang projecting inwardly from the peripheral wall for holding the sheet in place. The sheet is mounted on the panel. The outer side of the sheet is adhesive free in a region located under the overhang. The device has a cover arranged to fit on the panel and at least partially cover the panel. The cover has at least one internal detent for engaging the panel and holding the panel in place.

Devices of the foregoing type offer a safe and effective way of capturing small pests, avoiding many of the disadvantages and unpleasantness associated with the prior art. In a disclosed embodiment a handle supports a perforated panel that is overlaid with a sheet. The outer side of this sheet has a pest detaining adhesive. Accordingly, the user can use the handle to swing the adhesive sheet to intercept and capture a flying insect. The adhesive sheet can then be removed from the panel, discarded and replaced with a fresh adhesive sheet. In some cases, the outside of the replacement sheet may be covered with a removable protective film that covers the pest detaining adhesive to facilitate handling during installation.

In a disclosed embodiment the adhesive sheet lies within the borders of a peripheral wall on the panel. The peripheral wall allows the user to lay the device down on a surface without fear of the adhesive sheet sticking to the surface. Also, the device may be simply placed over a crawling insect such as a spider whose escape route is then blocked by the peripheral wall. Eventually this crawling insect will climb the peripheral wall only to be captured on the adhesive.

In addition, this peripheral wall helps to center the sheet and keep it in position. Also to keep the sheet in place, the peripheral wall may have an inwardly projecting overhang in the form of a tab that hangs over the adhesive sheet. The outside of the adhesive sheet may have adhesive-free regions under the overhanging tabs to avoid sticking to the tabs during sheet removal.

In some embodiments the peripheral wall can extend in opposite directions from the panel thereby defining bordered regions on opposite sides of the panel that may each contain an adhesive sheet. This doubles the effectiveness of the device, which now can be swung in either direction.

Moreover, some embodiments may use sheets in the form of a stack of layers each coated with a pest detaining adhesive. The layers may have a removable film to allow easy separation of the layers. Accordingly, stack can be installed on the panel of so that used layers can be easily removed and discarded.

In a disclosed embodiment the adhesive sheet has a pull tab to facilitate sheet removal. To make the pull tab less obtrusive, it is placed in a recess along the margin of the sheet. To make a pull tab more accessible it is bent or deflected upwardly, making it easier to grab. In embodiments where the sheet is composed of a stack of layers, each of the pull tabs is aligned and deflected upwardly from aligned marginal recesses.

The disclosed embodiment also employs a cover in the form of a five sided box having an open side into which the panel is inserted. The cover can hide captured insects and also avoid inadvertent touching of or contact with the adhesive.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein:

FIG. 1 is a plan view of a device in accordance with principles of the present invention;

FIG. 2 is a detail, fragmentary view of a portion of the device of FIG. 1 with its sheet removed;

FIG. 3 is a fragmentary, perspective view of a portion of the panel of FIG. 2;

DETAILED DESCRIPTION OF THE PREFERRED EMBODIMENTS

Figure 4:
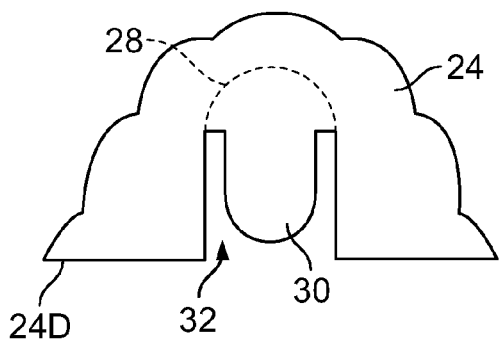
FIG. 4 is a detailed, fragmentary view of the sheet of FIG. 1.

Referring to FIGS. 1-3, the illustrated device has a tapered handle 10 rounded on one end where a hang hole 12 is located. Handle 10 has an H-shaped cross-section. Handle 10 supports a rectangular panel 14 having a perforated deck 16 surrounded on four side by peripheral wall 18. In some embodiments panel 14 may have an outline that is another polygonal shape, semicircular, round, oval, etc. The joint between handle 10 and panel 16 is reinforced with a pair of triangular reinforcing webs 19 extending between handle 10 and the adjacent portion of wall 18.

Deck 16 has a number of perforations 20 generally arranged as concentric arcs separated into four different quadrants, although other embodiments may have a simpler or more complex hole pattern. The perforations are optional but do help reduce weight and material costs.

Wall 18 has sections 18A and 18B rising in opposite directions from deck 16, although in some embodiments the wall may rise in just one direction. Inwardly projecting from wall 18A are four overhangs 22, shown as rounded cantilevered tabs. A complimentary arrangement of four tabs 22 also projects inwardly from wall 18B. There is clearance between tabs 22 and deck 16 to hold a pair of sheets 24 one on each side of deck 16.

The number, placement, dimensions and shape of the tabs 22 may be different in different embodiments. Also, in a given embodiment the tabs need not have the same shape. In embodiments where only a single sheet will be placed on one side of deck 16, wall 18 will only project in one direction and therefore tabs will be located only on one side of the deck. In some embodiments tabs 22 may be replaced with L-shaped fingers rising from deck 16. In still other embodiments tabs 22 may be replaced with undercuts at the base of walls 18A and 18B. Also, various types of mechanical clips and holding devices may be used in other embodiments as well.

Figure 5:
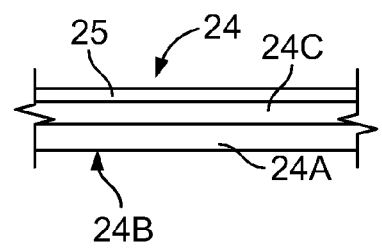
FIG. 5 is an edge view of the sheet of FIG. 1.

Referring to FIGS. 1, 4 and 5, sheet 24 comprises paper layer 24A, but other embodiments may employ instead a plastic film, cardboard or other sheet material. Sheet 24 has a rectangular margin 24D with rounded corners all designed to fit in the boundary of wall 18. The outer side of sheet 24 will be coated with a pest detaining adhesive 24C. The inner side 24B of sheet 24 will be uncoated. Adhesive 24B will be strong enough to capture pests that land or walk on the adhesive.

Adhesive 24C may be the type of adhesives commonly used in commercially available flypaper although any type of adhesive may be used that is strong enough to immediately capture the targeted pest. In this embodiment adhesive 24C is strong enough to capture flies, wasps, mosquitoes, ants, roaches, spiders, and the like. In some embodiments the adhesive 24C may be impregnated with a substance that attracts or lures the pest. The substance can emit an odor associated with a food source, an intraspecies signal, etc. In many embodiments the adhesive 24C will be made washable and with a stickiness that reduces the tendency to stick to furniture, clothing, etc.

The regions 26 of sheet 24 under overhangs 22 are adhesive free to prevent sheet 24 from sticking to the overhangs.

Another adhesive free region 28 is associated with pull tab 30, which is located in marginal recess 32. Eliminating adhesive in the region 28 allows a user to grasp pull tab 30 without the mess of touching the adhesive. Tab 30 is shown with rounded corners and may be about ⅜ inch (10 mm) long and ¼ inch (6 mm) wide although other dimensions and shapes may be employed in other embodiments.

Pull tab 30 does not extend beyond marginal recess 32 to simplify the overall shape of sheet 24 and to avoid interfering with wall 18. In fact, pull tab 30 is recessed slightly from margin 24D by for example 1/16 inch (1.6 mm). Also, in this embodiment tab 30 is deflected or curled so its distal end has a higher elevation than margin 24D, making the tab easier to grasp.

Sheet 24 has an optional removable covering 25 made of a substance (or impregnated or coated) in order to avoid sticking to adhesive 24C. Covering 25 can protect and preserve adhesive 24C, avoid unnecessary finger contact, and allow similar sheets to be stacked without sticking together.

Figure 6:
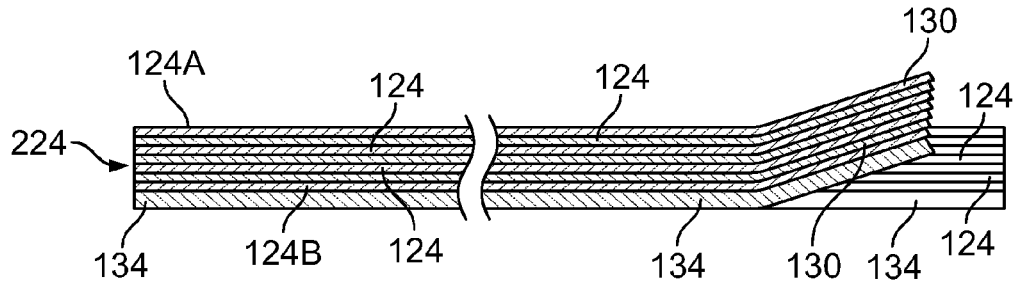
FIG. 6 is a cross-sectional view of a sheet having a stack of layers on a backer, which is an alternate to the sheet shown in FIG. 5.

Referring to FIG. 6, the illustrated sheet 224 replaces the previously described sheet (sheet 24 of FIG. 5) with a stack of disposable layers 124 (seven layers in this exemplary embodiment). Each of the layers 124 will be paper that is coated on one side with a pest detaining adhesive (the same adhesive 24C illustrated in FIG. 5). Again, instead of paper, the layer 124 may employ a plastic film, cardboard or other sheet material. This adhesive coating will be formulated to allow easy separation of the individual layers 124 when used in a manner to be described presently. Also in some embodiments, a single removable cover (similar to cover 25 of FIG. 5) may be placed atop the uppermost layer 124A to allow easy handling and to allow similar stacks to be bundled without sticking together.

In this embodiment, the underside of the lowermost layer 124B is attached to a backer 134 made of a thicker material, for example, cardboard. The separable stack of disposable layers 124 and backer 134 may have the same outline as the previously mentioned sheet (sheet 24 of FIG. 1). In particular, pull tabs 130 may have the same outline and may be located in a marginal recess. Also as before, pull tabs 130 are deflected or curled so that their distal ends have a higher elevation, making them easier to grasp. Tabs 130 are shown herein deflected about 30°, although other manners and degrees of deflection are contemplated.

Figure 7:
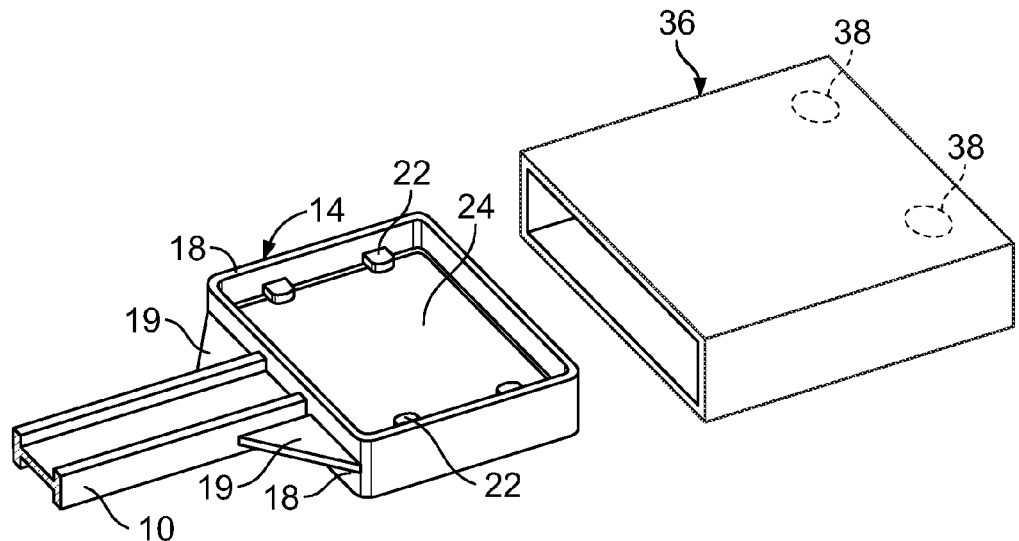
FIG. 7 is a perspective view of the device of FIG. 1 (a portion of the handle broken away for illustrative purposes) and a cover for covering the panel.
Figure 8:
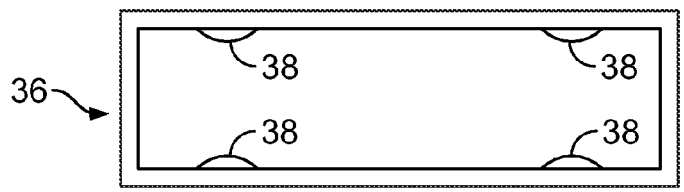
FIG. 8 is an end view of the cover of FIG. 6.

Referring to FIGS. 7 and 8, cover 36 is a hollow five-sided rectangular case having an open side for receiving panel 14. Cover 36 is sized slightly larger than panel 14 and has two pairs of opposing internal detents 38. Detents 38 are shown in this embodiment as round nubs protruding from the inner surfaces of the larger opposing sides of cover 36. Detents 38 are offset from the closed end of cover 36 a distance slightly greater than the thickness of wall sections 18A and 18B to allow the detents to ride over and snap around the wall sections. Instead of dome-shaped detents, in some embodiments the detents may be eliminated or replaced with alternate detents such as spring clips.

Instead of a five sided case, the disclosed cover can be a clamshell design with six sides and a hole for the handle. In some cases the cover may be five sided with a hole on one side so the cover can be slipped over the handle 10 and slid over the panel 14. In this latter embodiment, the cover may be a secured to a vertical surface and then used as a holster for the device.

To facilitate an understanding of the principles associated with the foregoing apparatus, its operation will be briefly described in conjunction with FIGS. 1 through 8. Sheet 24 is placed inside wall 18 on one side of panel 14 with pull tab 30 adjacent handle 10 (although sheet 24 could in fact be rotated 180°, or for square sheets ±90°). In particular, opposite edges of sheet 24 are inserted under overhangs 22 by bowing the sheet slightly and releasing it. Sheet 24 may alternatively be inserted under overhangs 22 by angling the edge of sheet 24 opposite pull tab 30 under the pair of overhangs closest to handle 10. Sheet 24 is then slid upward toward the end of panel 14 opposite handle 10. Sheet 24 is lightly pressed against deck 16 as it is slid to ensure that the edge of sheet 24 opposite pull tab 30 slides between deck 16 and the pair of overhangs 22 located furthest from handle 10.

An additional sheet (not shown) is similarly inserted on the opposite side of panel 14. The protective covers 25 are then removed from both sheets 24 exposing the pest detaining adhesive 24C, although some users may prefer to remove covers 25 before installing sheets 24 onto panel 14.

A user may grasp handle 10 and swing panel 14 toward insects flying nearby. Insects impacting sheet 24 are captured on the pest detaining adhesive 24C. In some cases, panel 14 may be placed over a small pest on a surface so that peripheral wall 18A (or 18B) and sheet 24 form a cage containing the pest (not necessarily an insect but some other small pest, such as a spider). Panel 14 is held in place until the pest moves about and becomes stuck on the pest detaining adhesive 24C. Moreover, panel 14 may be slid while pressing wall 18A down, in order to agitate the pest and cause it to move into contact with the adhesive 24C.

In some cases a flying insect may land on an uneven or fragile surface where the panel 14 may not be placed effectively or safely. In this case, the user may simply quickly bring the panel 14 nearby and the insect may still contact adhesive 24C and be captured anyway.

When not in use, the device may be placed upon a level surface with wall section 18A (or 18B) resting on the surface. Advantageously, wall 18 elevates sheet 24 and its adhesive 24C to avoid contact with the resting surface. Also, if captured pests are on only one side, they can be positioned facing down and therefore hidden from view.

When the user is finished catching insects, panel 14 may be inserted in cover 36 for storage. Panel 14 is inserted into the open end of cover 36 until the edges of walls 18A and 18B contact detents 38. The user continues to push panel into cover 36 causing detents 38 to snap over wall 18. Wall 18 is retained between the closed end of cover 36 and detents 38. Thus positioned, cover 36 thereby conceals the pests trapped on sheet 24 and shield the adhesive 24C. A user may later grasp and pull handle 10 away from cover 36 when the device is to be used again.

With the cover 36 removed, a user may remove sheet 24 by grasping pull tab 30 and lifting sheet 24 away from deck 16 and then pulling toward handle 10 until the edge of sheet 24 opposite pull tab 30 clears overhangs 22. Sheet 24 may also be removed from panel 14 by grasping pull tab 30 and pulling perpendicular to deck 16 until the edges of sheet 24 clear overhangs 22. The used sheet may then be discarded and replaced with a new sheet using one of the methods previously described.

The multilayered sheet 224 of FIG. 5 may also be placed on each side of panel 14 instead of sheet 24. The insertion of sheet 224 is similar to that of sheet 24 previously described.

When the user wants to expose a fresh layer of adhesive, the uppermost layer 124A may be removed by grasping its pull tab 130 and peeling it away from the sheet located directly beneath it. Layers 124 may be removed from the stack as necessary until the last layer 124B is used. At this time, the user may remove the last layer 124B together with backer 134 and install a new separable stack 224 as previously described.

It is appreciated that various modifications may be implemented with respect to the above described embodiments. For example, the pull tabs may extend beyond the margin of the sheet and may also bend outwardly to allow easy grasping. In some embodiments the single optional pull tab can be replaced with multiple pull tabs at different positions on the same sheet. For embodiments having multiple separable layers, the pull tabs may be located at different spaced positions for each layer. In some cases the overhangs may be replaced with a snap-in ring for holding the sheet in place. Alternatively, the underside of the sheet may have a light adhesive coating for temporarily holding the sheet onto the panel. In addition, different type of types of sheets may be placed on opposite sides of the panel so that one side may target large flying insects while the other side targets small spiders. Moreover, the two oppositely projecting wall sections may have different heights to accommodate different size pests. In fact, in some embodiments there may be no wall projecting from one side even though an adhesive sheet is placed on that side.

Obviously, many modifications and variations of the present invention are possible in light of the above teachings. It is therefore to be understood that within the scope of the appended claims, the invention may be practiced otherwise than as specifically described.

The invention claimed is:

1. A device for capturing small pests comprising:
   a sheet having an outer side; and
   a panel with a handle, said panel having at least one overhang for holding said sheet in place, said sheet being mounted on said panel, said overhang extending inwardly over said panel and being spaced from said panel to provide clearance for insertion of said sheet between said overhang and said panel, said outer side of said sheet being partially coated with a pest detaining adhesive and being adhesive free in a region located under said overhang.

2. A device according to claim 1 wherein said panel has a peripheral wall, said overhang projecting inwardly from said peripheral wall.

3. A device according to claim 2 wherein said peripheral wall has a first and a second section rising in opposite directions from said panel.

4. A device according to claim 1 comprising:
   a cover arranged to fit on said panel and at least partially cover said panel.

5. A device according to claim 4 wherein said cover has five closed sides and one open side.

6. A device according to claim 4 wherein said cover has at least one internal detent for engaging said panel and holding said panel in place.

7. A device according to claim 6 wherein said panel is perforated.

8. A device according to claim 4 wherein said sheet comprises:
   a separable stack of disposable layers each having pest detaining adhesive applied to at least a portion of at least one side; and
   a backer underlying said stack of disposable layers.

9. A device according to claim 1 wherein said sheet has a margin with a marginal recess, said sheet having a pull tab in said recess that is no longer or wider than said recess.

10. A device according to claim 9 wherein said pull tab is deflected.

11. A device according to claim 9 wherein said sheet comprises:
a separable stack of disposable layers each having pest detaining adhesive applied to at least a portion of at least one side, said pull tab being replicated on each of said layers.

12. A device for capturing small pests according to claim 11 wherein said pull tab of each of said disposable layers is deflected.

13. A device for capturing small pests according to claim 12 wherein said sheet comprises:
a backer underlying said separable stack of disposable layers.

14. A device for capturing small pests comprising:
a sheet including a separable stack of disposable layers each having pest detaining adhesive applied to at least a portion of an outer side, said layers each having a margin with a marginal recess, each of said layers having a deflected pull tab in said recess that is no longer or wider than said recess;

a perforated panel with a handle, said panel having a peripheral wall with a first and a second section rising in opposite directions from said panel, said panel having at least one overhang projecting inwardly from said peripheral wall for holding said sheet in place, said at least one overhang being spaced from said panel to provide clearance for insertion of said sheet between said overhang and said panel, said sheet being mounted on said panel, said outer side of said sheet being adhesive free in a region located under said overhang; and a cover arranged to fit on said panel and at least partially cover said panel, said cover having at least one internal detent for engaging said panel and holding said panel in place.

* * * * *